(12) United States Patent
Uchida

(10) Patent No.: US 12,046,969 B2
(45) Date of Patent: Jul. 23, 2024

(54) STATOR OF ROTARY ELECTRIC MACHINE AND ROTARY ELECTRIC MACHINE

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventor: Hidenori Uchida, Mie (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 185 days.

(21) Appl. No.: 17/804,469

(22) Filed: May 27, 2022

(65) Prior Publication Data

US 2022/0294298 A1 Sep. 15, 2022

Related U.S. Application Data

(63) Continuation of application No. PCT/JP2020/042151, filed on Nov. 11, 2020.

(30) Foreign Application Priority Data

Mar. 11, 2020 (WO) .................. PCT/JP2020/010598

(51) Int. Cl.
*H02K 3/28* (2006.01)
(52) U.S. Cl.
CPC ..................................... *H02K 3/28* (2013.01)

(58) Field of Classification Search
CPC ................. H04L 1/0003; H04L 1/0005; H04L 27/0012; H04L 5/0007; H04L 5/0041;
(Continued)

(56) References Cited

U.S. PATENT DOCUMENTS

2004/0119362 A1 6/2004 Neet
2010/0289374 A1 11/2010 Koga et al.
(Continued)

FOREIGN PATENT DOCUMENTS

JP 2004-282996 A 10/2004
JP 2009-11064 A 1/2009
(Continued)

OTHER PUBLICATIONS

JP-2014050180-A, Koshino N, all pages (Year: 2014).*
(Continued)

*Primary Examiner* — Naishadh N Desai
(74) *Attorney, Agent, or Firm* — Maier & Maier, PLLC

(57) ABSTRACT

A bridge part of a first coil segment includes a first bridge section extending in a circumferential direction and including a first bending part reducing an inclination angle, and a second bridge section extending in the circumferential direction toward the first linear part and including a second bending part reducing an inclination angle. A bridge part of a second coil segment includes a third bridge section extending in the circumferential direction toward a second linear part and including a third bending part reducing an inclination angle, and a fourth bridge section extending in the circumferential direction toward the first linear part and including a fourth bending part reducing an inclination angle.

4 Claims, 7 Drawing Sheets

(58) Field of Classification Search
CPC .. H04L 5/0053; H04L 5/0091; H04W 74/004; H04W 74/006; H04W 72/23; H04W 72/541; Y02D 30/70; H02K 15/0421; H02K 15/064; H02K 3/12; H02K 3/28
See application file for complete search history.

(56) References Cited

U.S. PATENT DOCUMENTS

| | | | | |
|---|---|---|---|---|
| 2013/0000105 A1* | 1/2013 | Hasegawa | ........... | H02K 15/0428 29/596 |
| 2016/0248289 A1 | 8/2016 | Tamura | | |
| 2016/0248291 A1* | 8/2016 | Tamura | ................... | H02K 3/12 |

FOREIGN PATENT DOCUMENTS

| | | | |
|---|---|---|---|
| JP | 2010-239679 | A | 10/2010 |
| JP | 2011-193597 | A | 9/2011 |
| JP | 4919059 | B2 | 4/2012 |
| JP | 5359463 | B2 | 12/2013 |
| JP | 2014-50180 | A | 3/2014 |
| JP | 2014050180 | A * | 3/2014 |
| JP | 5846081 | B2 | 1/2016 |
| JP | 2016-152752 | A | 8/2016 |
| JP | 2016-152753 | A | 8/2016 |
| JP | 2017-184587 | A | 10/2017 |
| WO | 2010007950 | A1 | 1/2010 |
| WO | 2018168108 | A1 | 9/2018 |

OTHER PUBLICATIONS

International Search Report dated Jun. 2, 2020 in PCT/JP2020/010598, filed on Mar. 11, 2020, 2 pages.
International Search Report dated Jan. 12, 2021 in PCT/JP2020/042151, filed on Nov. 11, 2020, 2 pages.
Extended Search Report issued on Mar. 18, 2024, in corresponding European Application No. 20924293.2, 13 pages.

* cited by examiner

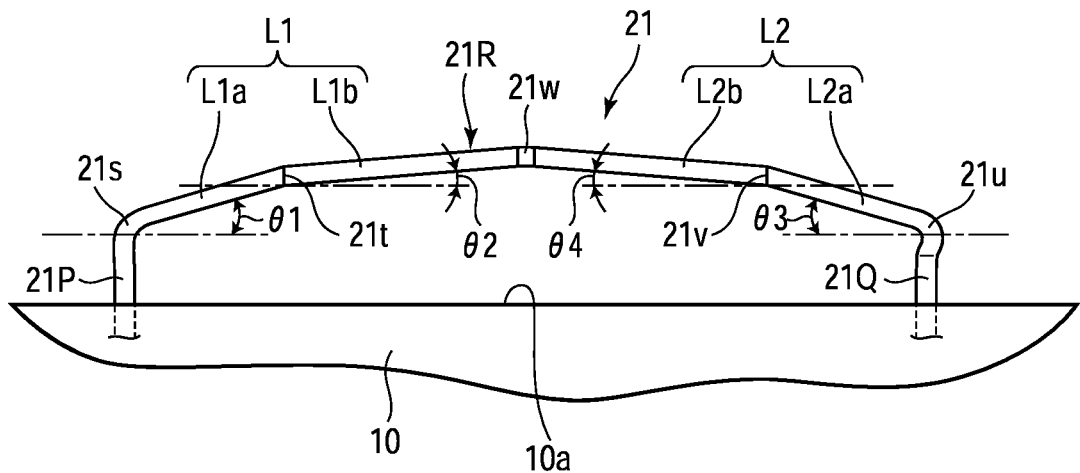
F I G. 6A
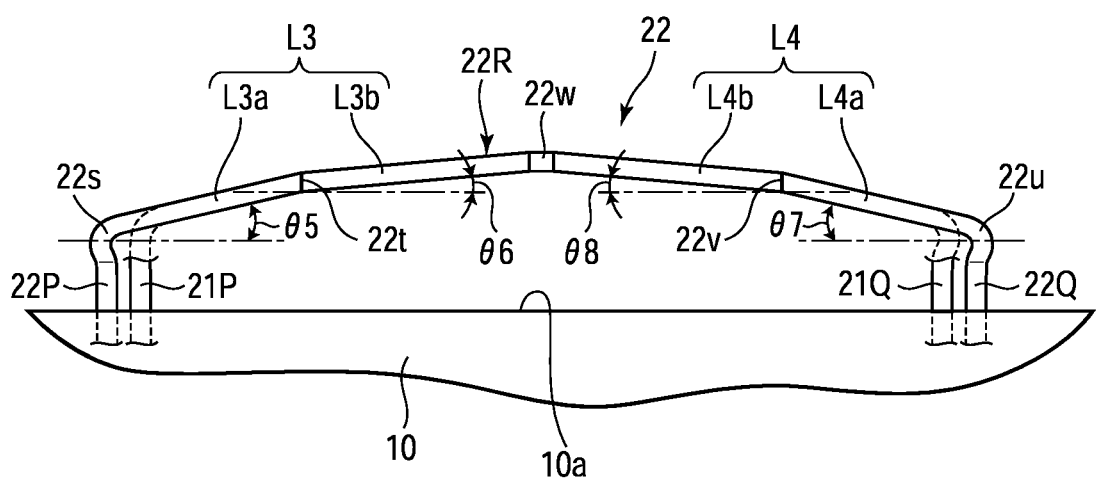
F I G. 6B

STATOR OF ROTARY ELECTRIC MACHINE AND ROTARY ELECTRIC MACHINE

CROSS-REFERENCE TO RELATED APPLICATIONS

This application is a Continuation application of PCT Application No. PCT/JP2020/042151, filed Nov. 11, 2020 and based upon and claiming the benefit of priority from PCT Application No. PCT/JP2020/010598, filed Mar. 11, 2020, the entire contents of all of which are incorporated herein by reference.

FIELD

Embodiments described herein relate generally to a stator of a rotary electric machine and a rotary electric machine.

BACKGROUND

Rotary electric machines include a cylindrical stator and a rotor arranged rotatably in a field space of the stator. The stator includes a stator core including multi-layered annular electromagnetic steel plates, and a stator coil formed of a flat conductor and attached to the stator core. Coils formed of a plurality of coil segments bonded together in series include coil ends protruding outward from both end surfaces of the stator core in the axial direction. In recent years, demand for smaller stators of rotary electric machines is high.

BRIEF DESCRIPTION OF THE DRAWINGS

FIG. 6A is a side view schematically illustrating the first coil segment.

FIG. 6B is a side view schematically illustrating the second coil segment.

DETAILED DESCRIPTION

Figure 1:
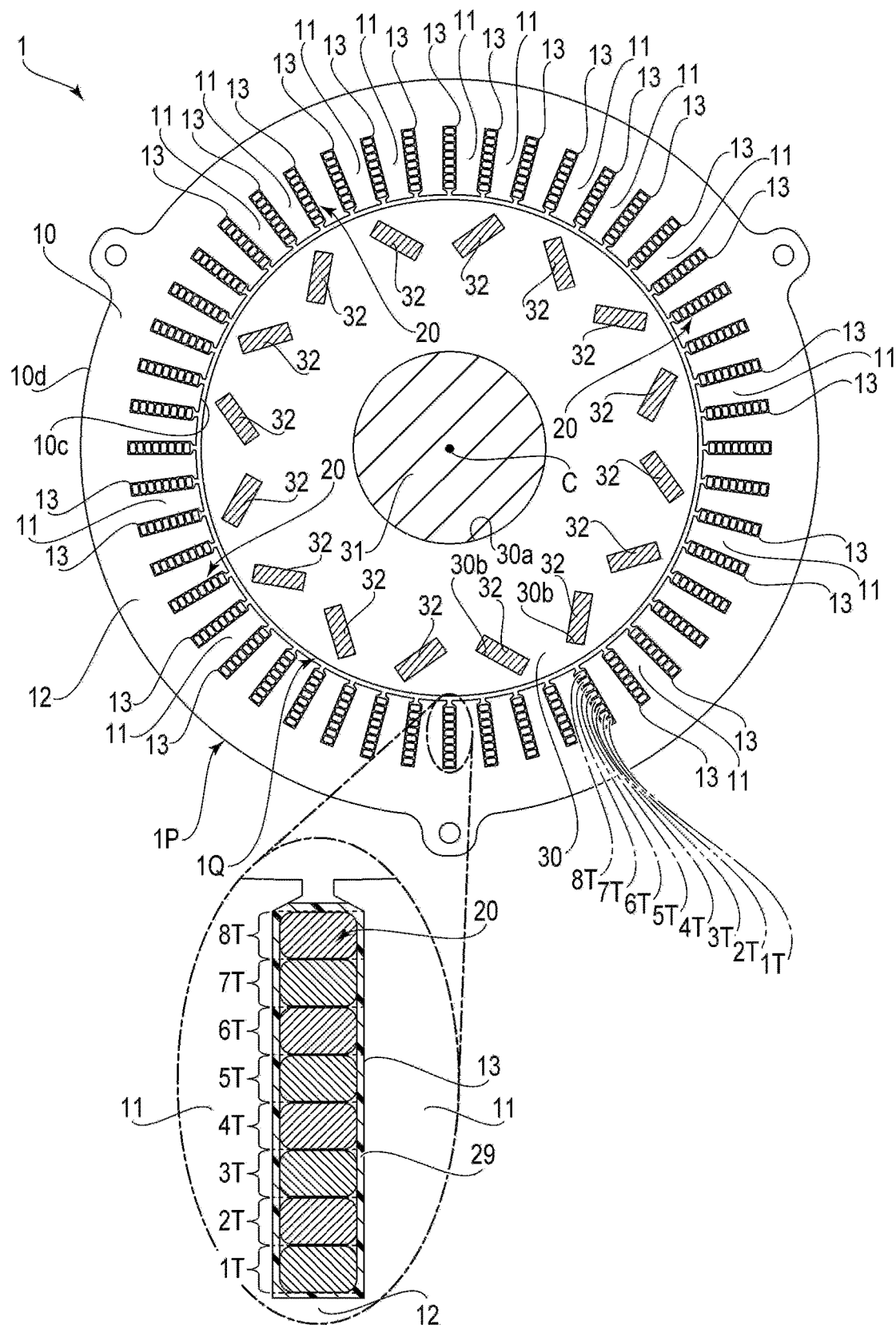
FIG. 1 is a lateral cross-sectional view of a rotary electric machine of an embodiment.

Embodiments will be described hereinafter with reference to the accompanying drawings. In general, according to one embodiment, a stator of rotary electric machine comprises a stator core including a yoke, a plurality of teeth, one end surface positioned at one end of an axial direction, and other end surface positioned in the other end of the axial direction, the stator core forming slots each extending in a radial direction between the teeth adjacent to each other; and a plurality of stator coils each of which is structured by joining a plurality of coil segments to each other, each of the coil segments being formed of a rectangular conductor and including a first linear part and a second linear part positioned separately in the slots, and a bridge part connecting the first linear part and the second linear part on a side of the one end surface of the stator core.

The coil segments include a first coil segment including a first linear part positioned outermost in the radial direction among the coil segments arranged in the radial direction in the slot, a second linear part positioned outermost in the radial direction among the coil segments in a different slot, and a bridge part, and a second coil segment including a first linear part positioned outermost in the radial direction among the coil segments in the slot adjacent to the first linear part of the first coil segment in the opposite side of the second linear part of the first coil segment, a second linear part positioned outermost in the radial direction among the coil segments in the slot adjacent to the second linear part of the first coil segment in the opposite side of the first linear part of the first coil segment, and a bridge part.

The bridge part of the first coil segment includes a first bridge section extending in a circumferential direction of the stator core toward the second linear part through a first curving part curving from the first linear part of the first coil segment to the second linear part side, inclining outward in the axial direction at a first inclination angle with respect to a flat surface parallel to the one end surface, the first bridge section including a first bending part in a halfway through the circumferential direction forming a second inclination angle as the angle inclining with respect to the flat: surface parallel to the one end surface, which is smaller than the first inclination angle, and a second bridge section extending in the circumferential direction toward the first linear part on the outside in the radial direction than is the first bridge section through a second curving part curving outward in the radial direction from the second linear part of the first coil segment, inclining outward in the axial direction at a third inclination angle with respect to a flat surface parallel to the one end surface, the second bridge section including a second bending part in a halfway through the circumferential direction forming a fourth inclination angle as the angle inclining with respect to the one end surface, which is smaller than the third inclination angle, and the bridge part of the second coil segment includes a third bridge section extending in the circumferential direction toward the second linear part of the second coil segment on the outside in the radial direction than is the second bridge section through a third curving part curving outward in the radial direction greater than is the second curving part from the first linear part of the second coil segment, inclining outward in the axial direction at a fifth inclination angle with respect to a flat surface parallel to the one end surface, the third bridge section including a third bending part in a halfway through the circumferential direction forming a sixth inclination angle as the angle inclining with respect to a flat surface parallel to the one end surface, which is smaller than the fifth inclination angle, and a fourth bridge section extending in the circumferential direction toward the first linear part of the second coil segment in the outside in the radial direction than is the third bridge section through a fourth curving part curving outward in the radial direction greater than is the third curving part from the second linear part of the second coil segment, inclining outward in the axial direction at a seventh inclination angle with respect to a flat surface parallel to the one end surface, the fourth bridge section including a fourth bending part forming an eighth inclination angle as the angle inclining with respect to a flat surface parallel to the one end surface, which is smaller than the seventh inclination angle.

Note that, embodiments are merely examples, and the contents of the embodiments do not limit the scope of the invention. Modifications which can easily be conceived by a person having an ordinary skill are naturally encompassed in the scope of the invention. For easier understanding of the description, size, shape, and the like of each element may be changed from the actual implementation while being only schematically depicted in the figures.

Embodiment

With reference to FIGS. 1 to 6, a rotary electric machine 1 and a stator 1P and a rotor 1Q of the rotary electric machine 1 of an embodiment will be described.

Figure 2:
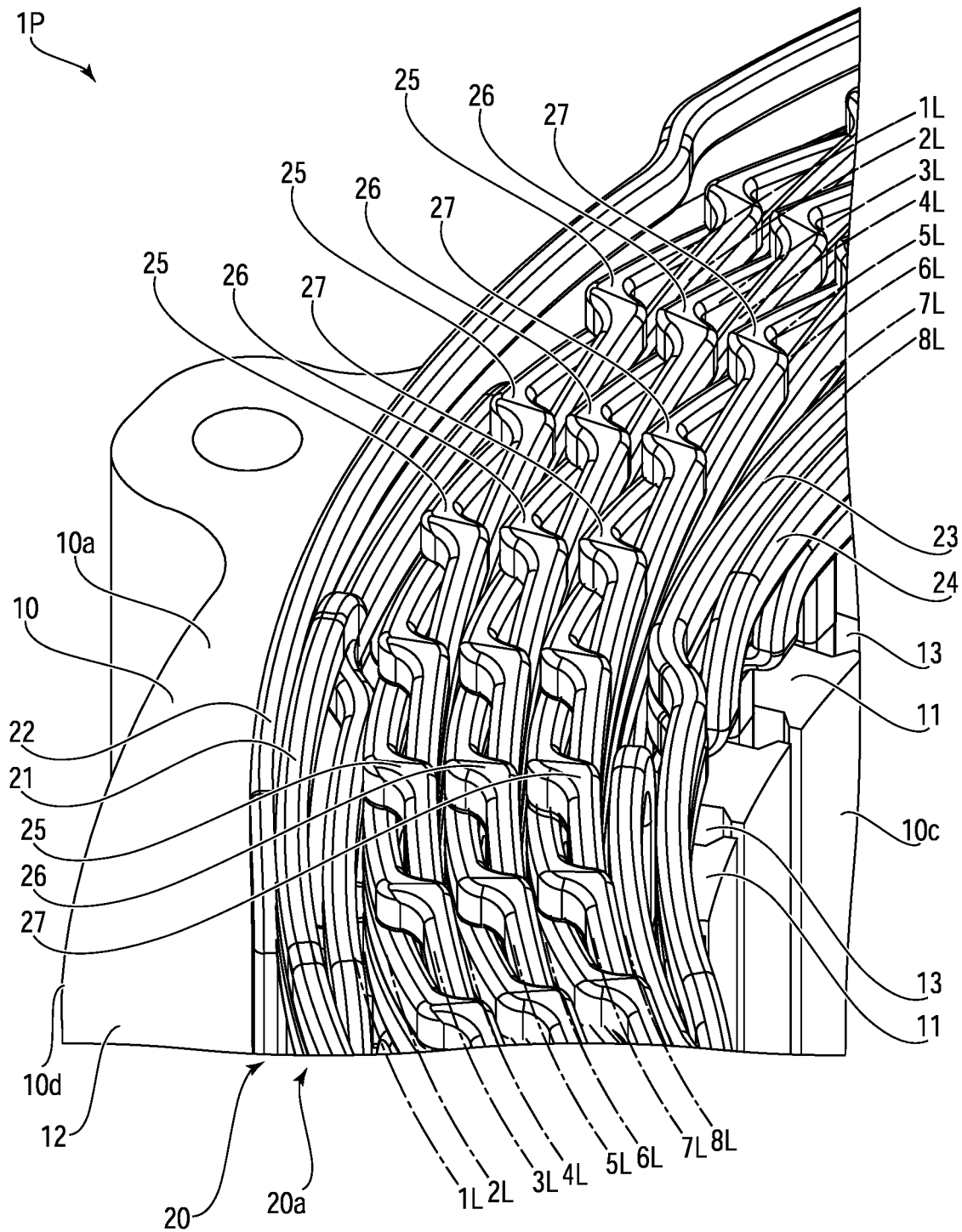
FIG. 2 is a perspective view illustrating a part of a stator of the rotary electric machine from one end surface side (non-welding side of each coil segment) of the stator core.
Figure 3:
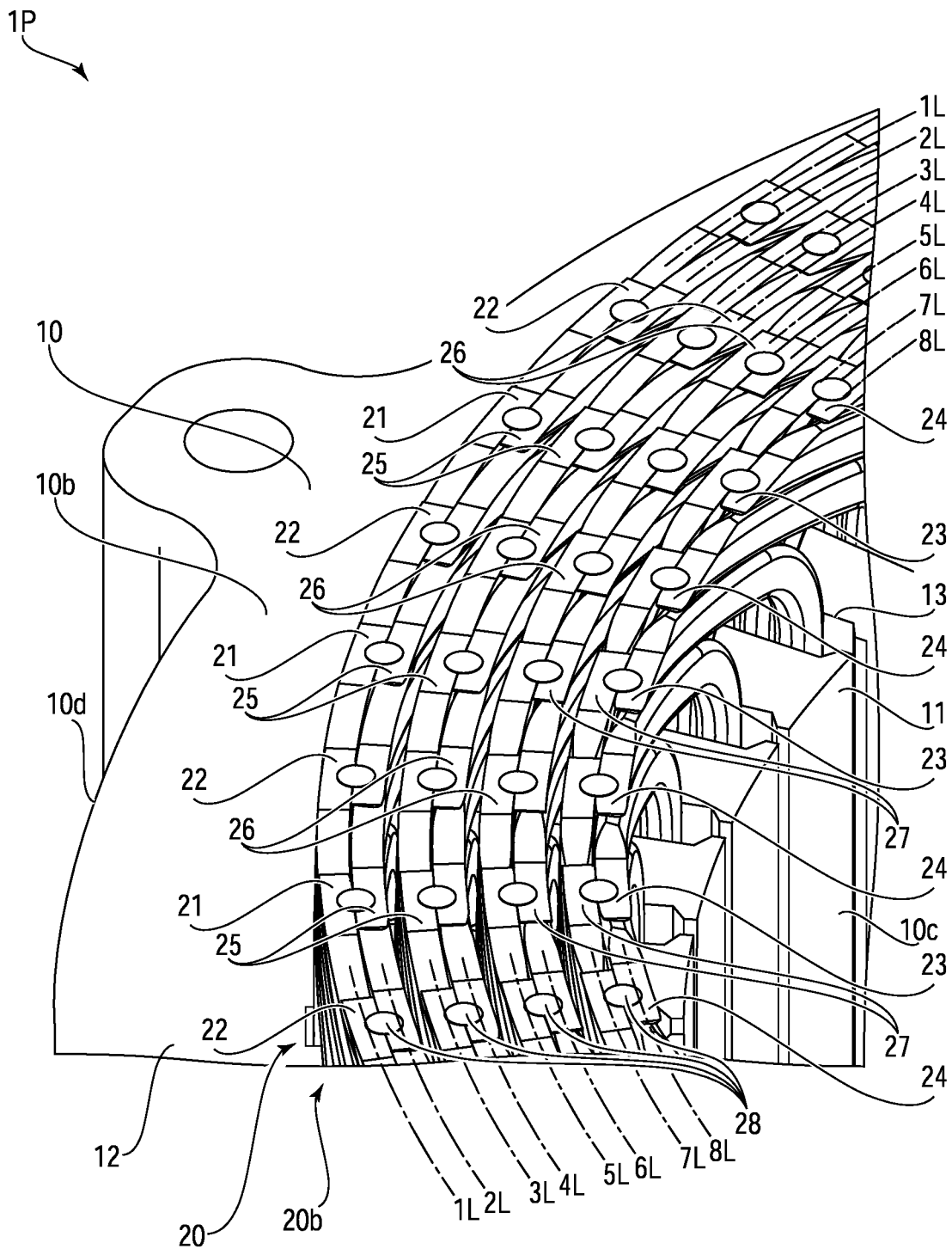
FIG. 3 is a perspective view illustrating a part of the stator from the other end surface side (welding side of each coil segment) of the stator core.

FIG. 1 is a cross-sectional view of the rotary electric machine 1 of the embodiment. FIG. 2 is a perspective view illustrating a part of the stator 1P of the rotary electric machine, from one end surface 10a side (non-welding side of each coil segment) of a stator core 10. FIG. 3 is a perspective view illustrating a part of the stator 12, from the other end surface 10b side (welding side of each coil segment) of the stator core 10.

As shown in FIG. 1, the rotary electric machine 1 is configured as a permanent magnet type rotary electric machine, for example. The rotary electric machine 1 includes the stator 1P and the rotor 1Q arranged in the field space of the stator 1P. The field space of the embodiment is the space where the magnetic field is generated by the stator 1P.

In the following description, a direction of extension of the central axis C of the rotary electric machine 1 is referred to as axial direction, a direction of rotation around the central axis C as circumferential direction, and direction orthogonal to the axial and circumferential directions as radial direction.

The stator 1P comprises a stator core 10, and a plurality of stator coils 20 attached to the stator core 10.

The stator core 10 includes a laminated body with a plurality of circular-shaped electromagnetic steel plates formed of magnetic material such as silicon steel which are laminated concentrically with respect to the central axis C. The electromagnetic steel plates are connected to each other by welding multiple locations on the outer periphery of the laminated body. The stator core 10 has an inner peripheral surface 10c facing the rotor 1Q in the inner radial direction, and an outer peripheral surface 10c facing the rotor 1Q supported by a casing (not shown) in the outer radial direction. As shown in FIGS. 2 and 3, the stator core 10 has one end surface 10a located at one end in the axial direction, and another end surface 10d located at the other end in the axial direction. The one end surface 10a and the other end surface 10b are orthogonal to the central axis C, respectively.

As shown in FIG. 1, the stator core 10 includes a cylindrical yoke 12 located in the outer radial direction, and a plurality of (for example, 48) of teeth 11 extending in the radial direction of the stator core 10 from the yoke 12 in the circumferential direction of the stator core 10 at regular intervals. A slot 13 is provided between adjacent teeth 11 in the circumferential direction of the stator core 10. 48 slots 13 extend in the radial direction of the stator core 10 between the adjacent teeth 11 and are evenly spaced from each other in the circumferential direction of the stator core 10. The slots 13 penetrate axially from one end surface 10a to the other end surface 10b of the stator core 10. The slot 13 is open on the inner surface 10c of the stator core 10.

As shown in FIG. 1, the stator coil 20 includes a flat conductor with a rectangular cross-section. The long side of the stator coil 20 faces the radial direction of the stator core 10 in the slot 13. The stator coil 20 is formed of copper or aluminum with sufficient conductivity. The stator coil 20 includes a first coil end 20a (FIG. 2) extending axially outward from one end surface 10a of the stator core 10, and a second coil end 20b (FIG. 3) extending axially outward from the other end surface 11b of the stator core 10. That is, in the stator coil 20, the part extending outward from the end surface of the stator core 10 and crossing between different slots 13 corresponds to the first coil end 20a or the second coil end 20b. The stator coil 20 includes current input outlet wires at one end and neutral wires connected to each other at the other end.

As shown in FIG. 2, the stator coil 20 is placed in the slot 13 of the stator core 10 in a distributed arrangement. In the embodiment, there are two stator coils 20 connected in parallel and receiving current in phase U, two stator coils 20 connected in parallel and receiving current in phase V, and two stator coils 20 connected in parallel and receiving current in phase W. That is, the rotary electric machine 1 is driven by a three-phase AC power supply of U-phase, V-phase, and W-phase.

As shown in FIGS. 2 and 3, the stator coil 20 includes a plurality of coil segments (First coil segment 21 to seventh coil segment 27) formed of flat conductor, bonded in series. The coil segment integrally includes a first linear part and a second linear part, which are placed in different slots 13, and a bridge part connecting the first linear part and the second linear part in one end surface 10a side in the axial direction of the stator core 10. As in FIG. 3, the multiple coil segments are bonded in series via weld beads 28 on the other end surface 10b side of the stator core 10. In the stator coil 20, the joint surface of coil segments is, for example, powder coated, or covered with an insulating material such as varnish to ensure electrical insulation. As in FIG. 1, the surfaces (sides) other than the bonding surfaces of coil segments are covered with an insulating film, such as enamel, to ensure electrical insulation. Furthermore, the coil segments arranged in the same slot 13 are packaged integrally by insulating paper 29 to ensure electrical insulation.

As in FIGS. 1 to 3, the first stator coil 20 of each phase (three phases: U, V, and W) includes, a first coil segment 21 inserted into an area 1T positioned radially outermost in each slot 13 (FIG. 1), which is one lane of the concentric circle of the stator core 10 (FIGS. 2 and 3), a fifth coil segment 2J inserted across an area 2T (lane 2) and an area 3T (lane 3) of each slot. 13, a sixth coil segment 26 inserted across an area 4T (lane 4) and an area 5T (lane 5) of each slot. 13, a seventh coil segment 27 inserted across an area 6T (lane 6) and an area 7T (lane 7) of each slot 13, and a third coil segment 23 inserted into an area 8T (lane 8) positioned radially innermost in each slot 13, connected in series in the order stated above.

As in FIGS. 1 to 3, the second stator coil 20 of each phase includes a second coil segment 22, fifth coil segment 25, sixth coil segment 26, and seventh coil segment 27, and a fourth coil segment 24 inserted into an area BT (innermost lane 8) of each slot. 13, connected in series in the order stated above. The second stator coil 20 of each phase is electrically connected in parallel with the first stator coil 20.

Figure 4:
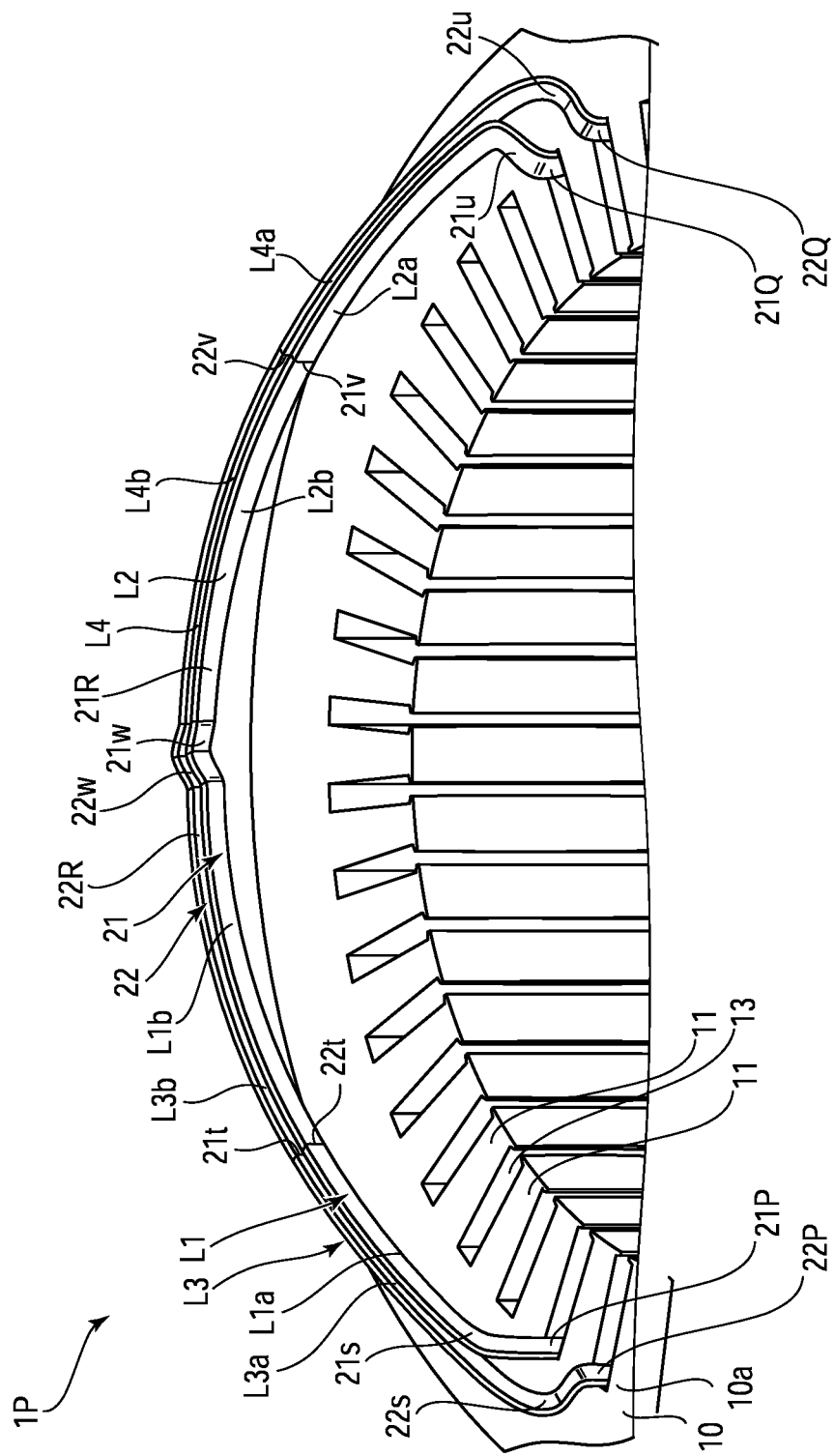
FIG. 4 is a perspective view illustrating a first coil segment and a second coil segment separately, arranged in the outermost part of slots.

FIG. 4 is a perspective view illustrating the first coil segment 21 and the second coil segment. 22 separately, disposed in the outermost area 1T (lane 1) of the slot 13.

Figure 5:
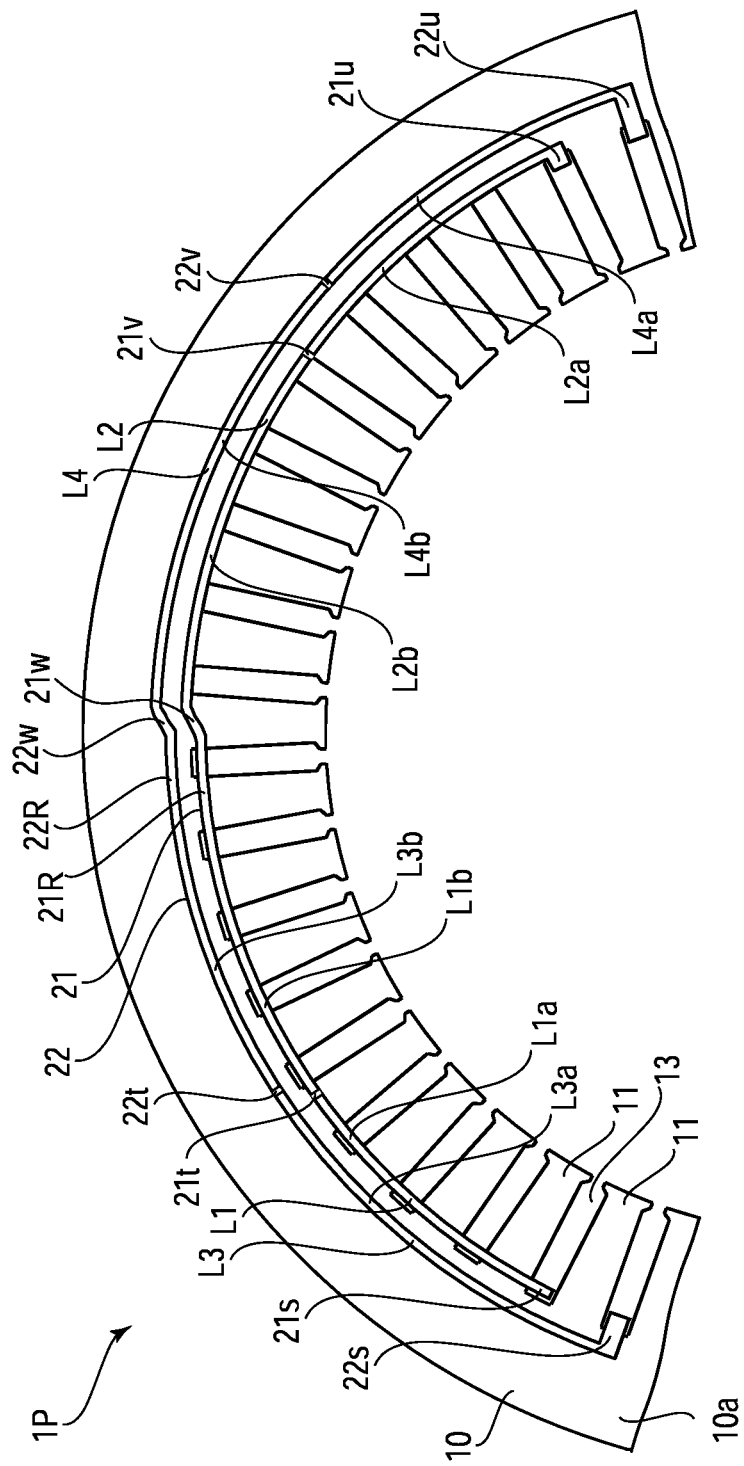
FIG. 5 is a plan view of the first coil segment and the second coil segment separately, arranged in the outermost part of slots (plan view of FIG. 4 viewed from the axial direction).

FIG. 5 is a plan view illustrating the first coil segment 21 and the second coil segment 22 separately, disposed in the outermost area 1I (lane 1) (plan view of FIG. 4 from the axial direction). FIG. 6 is a side view illustrating the first coil segment 21 and the second coil segment 22 in the area 1T (lane 1) of the slot 13, viewed from the radial outer side of the stator core 10. With reference to FIGS. 4 to 6, among the coil segments of the stator coil 20, the first coil segment 21 and the second coil segment 22 arranged in the outermost peripheral area 1T (lane 1) of the slot 13 will be explained.

As in FIG. 4, the first coil segment 21 and the second coil segment 22 are arranged in the radially outermost side of the coil segments (between the first coil segment 21 and the seventh coil segment 27) arranged in the radial direction of the stator core 10 in the slot 13. That is, in the area 1T (lane 1) of the slot 13, any of a first linear part 21P or a second linear part 21Q of the first coil segment 21, or a first linear part 22P or a second linear part 22Q of the second coil segment 22 is placed. The first linear part 22P and the second linear part 22Q of the second coil segment 22 are disposed in different slots 13 in a manner to sandwich the first linear part 21P or the second linear part 21Q of the first coil segment 21 from both sides of the circumference of the stator core 10. In other words, the second coil segment 22 is longer in the circumferential direction of the stator core 10 than the first coil segment 21.

As in FIGS. 4 and 5, the first linear part 21P of the first coil segment 21 is located in the area 1T of the slot 13, and the second linear part 22Q is located in the area 1T of the other slot 13, which is located several slots (for example, 17 slots) apart in the circumferential direction. The bride part 21R of the first coil segment 21 extends along the circumferential direction of the stator core 10 from an extension end if the first linear part 21P to an extension end of the second linear part 21Q while being distant from the one end surface 10a.

The first linear part 22P of the second coil segment 22 is located in the area 1T of the slot 13 next to the second linear part 21P of the first coil segment 21 in the opposite side of the second linear part 21Q. The second linear part 22Q of the second coil segment 22 is located in the area 1T of the slot 13 next to the second linear part 21Q of the first coil segment 21 in the opposite side of the first linear part 21P. That is, the first linear part 21P and the second linear part 21Q of the first coil segment 21 are located between the first linear part 21P and the second linear part 22Q of the second coil segment 22, and are sandwiched between the first linear part 22P and the second linear part 22Q of the second coil segment 22 from both sides in the circumferential direction.

The bridge part 22R of the second coil segment 22 extends from the extension end of the first linear part 22P to the extension end of the second linear part 22Q along the circumferential direction of the stator core 10 while being distant from the one end surface 10a. The bridge part 22R is disposed radially outwardly with respect to the bridge part 21R of the first coil segment 21.

FIG. 6A is a schematic side view illustrating the first coil segment, and FIG. 6B is a schematic side view illustrating the second coil segment.

As in FIGS. 4, 5, and 6A, the bridge part 21R of the first coil segment 21 includes a first bridge section L1 and a second bridge section L2.

The first bridge section L1 extends in the circumferential direction of the stator core 10 toward the second linear part 21Q through a first curving part 21s which is bent to the side of the second linear part 21Q from the first linear part 21P of the first coil segment 21. The first bridge section L1 is inclined by a first inclination angle θ1 (≠0°, 180°) in the direction away from the one end surface 10a in the axial direction with respect to a flat surface parallel to the one end surface 10a of the stator core 10. The first bridge section L1 has a first bending part 21t which decreases the inclination angle with respect to the one end surface 10a in the middle way extending to the second linear part 210. That is, the first bridge section L1 includes a first inclined section L1a extending from the first curving part 21s to the first bending part 21t at the first inclination angle θ1, and a second inclined section Lib extending from the first bending part 21t to the extension end of the first bridge section L1 (top curving part 21w which will be described later) at a second inclination angle θ2 which is smaller than the first inclination angle θ1 (θ2<θ1, θ2≠0°, 180°).

In the present embodiment, the bending part in the first bridge section L1 is a part of the first bending part 21t, but it is not limited thereto, and there may be N bending parts in N positions where N is two or more. In that case, the Nth bending part that is relatively far from the first curving part 21s is set to have smaller inclination angle with respect to the one end surface 10a than is the N−1 part that is relatively close to the first curving part 21s. Furthermore, a structure in which the Nth bending part, which is the farthest from the first curving part 21s, is set to an inclination angle θ=zero, and the top of the bending part extends substantially parallel to the one end surface 10a may be adopted.

The second bridge section L2 extends in the circumferential direction of the stator core 10 toward the first linear part. 21P through a second curving part 21u which is bent from the extension end of the second linear part 21Q of the first coil segment 21 to the outside of the stator core 10 in the radial direction. The second bridge section L2 is located radially outward that is the first bridge section L1. The second bridge section L2 is inclined by a third inclination angle θ3 (≠0°, 180°) in the direction away from the one end surface 10a in the axial direction with respect to a flat surface parallel to the one end surface 10a of the stator core 10. The second bridge section 12 includes a second bending part 21v which decreases the inclination angle with respect to the one end surface 10a in a middle way to the first linear part 21P. That is, the second bridge section L2 includes a third inclined section L2a extending from the second curving part 21u to the second bending part 21v at an inclined angle θ3, and a fourth inclined section L2b extending from the second bending part 21v to the extension end of the second bridge section L2 (top curving part 21w) at an inclination angle θ4 which is smaller than the third inclination angle θ3 (θ4<θ3, θ4≠0°, 180°).

The third inclination angle θ3 may be common to or different from the first inclination angle θ1. The fourth inclination angle θ4 may be common to or different from the second inclination angle θ2. In the present embodiment, θ1=θ3 and θ2=θ4.

In the present embodiment, the bending part in the second bridge section L2 is a part of the second bending part 21v, but it is not limited thereto, and N bending parts may be disposed in N positions where N is two or more. In that case, the Nth bending part that is relatively far away from the second curving part 21u is set to have the inclination angle with respect to the one end surface 10a smaller than is the bending part of the N−1th bending part, which is relatively close to the second curving part 21u. Furthermore, a structure in which the Nth bending part, which is the farthest from the second curving part 21u, is set to an inclination angle θ=zero, and the top part extends substantially parallel to the one end surface 10a may be adopted.

The first bridge section L1 is connected to the second bridge section L2 via a first connection part 21w, which is bent or inclined in the radial direction. The first connection part 21w is positioned in the middle between the first linear part 21P and the second linear part 21Q in the circumferential direction, that is, the first connection part 21w is positioned between the first bridge section L1 and the second bridge section L2 to connect the first bridge section L1 and the second bridge section L2 together. The first connection part 21w forms the top part (top curving part) located in the bridge part 21R to be most distant in the axial direction from the one end surface 10a. In this example, the first connecting part 21w extends approximately parallel to the one end surface 10a.

As in FIGS. 4, 5, and 6B, the bridge part 22R of the second coil segment 22 includes a third bridge section L3 and a fourth bridge section L4.

The third bridge section L3 extends in the circumferential direction toward the second linear part 22Q through a third curving part 22s which is greatly bent from the first linear part 22P of the second coil segment 22 radially outwardly than is the shape of the second curving part. 21u. The third bridge section L3 is positioned radially outside the second bridge section L2. The third bridge section L3 is inclined by a fifth inclination angle 35 (≠0°, 180°) in the direction away from the one end surface 10a in the axial direction with respect to a flat surface parallel to the one end surface 10a of the stator core 10. The third bridge section L3 has a first bending part 22t which decreases the inclination angle with respect to the one end surface 10a in the middle way extending to the second linear part 22Q. That is, the third bridge section L3 includes a first inclined section L3a extending from the third curving part 22s to the third bending part 22t at the fifth inclination angle θ5, and a second inclined section L3b extending from the third bending part 22t to the extension end of the third bridge section L3 (top curving part 22w which will be described later) at a sixth inclination angle 96 which is smaller than the fifth inclination angle θ5 (θ6<θ5, θ6≠0°, 180°).

The third bridge section L3 is positioned radially outward with respect to the first bridge section L1 of the first coil segment 21 to be opposed to the first bridge section L1 with a gap therebetween.

The fourth bridge section L4 extends in the circumferential direction toward the first linear part 22P through a fourth curving part 22u which is greatly bent from the second linear part 22Q of the second coil segment 22 radially outwardly than is the shape of the third curving part 22s. The fourth bridge section L4 is positioned radially outside the third bridge section L3. The fourth bridge section L4 is inclined by a seventh inclination angle θ7 (#0°, 180°) in the direction away from the one end surface 10a in the axial direction with respect to a flat surface parallel to the one end surface 10a of the stator core 10. The fourth bridge section L4 has a fourth bending part 22-v which decreases the inclination angle with respect to the one end surface 10a in the middle way extending to the first linear part. 22P. That is, the fourth bridge section L4 includes a third inclined section L4a extending from the fourth curving part 22u to the fourth bending part 22v at the seventh inclination angle θ7, and a fourth inclined section L4b extending from the fourth bending part 22v to the extension end of the fourth bridge section L4 (top curving part 22w) at an eighth inclination angle 90 which is smaller than the seventh inclination angle θ7 (θ8<θ7, θ8≠0°, 180°).

The seventh inclination angle θ7 may be common to or different from the fifth inclination angle θ5. The eighth inclination angle θ8 may be common to or different from the sixth inclination angle θ6. In the present embodiment, θ5=θ7 and θ6=θ8. Furthermore, in the present embodiment, θ1=θ5 and θ2=θ6.

The fourth bridge section L4 of the second coil segment 22 is positioned radially outward with respect to the second bridge section L2 of the first coil segment 21 to be opposed to the second bridge section L2 with a gap therebetween.

As in FIG. 5, the third bridge section L3 is connected to the fourth bridge section L4 via a second connection part 22w, which is bent or inclined in the radial direction. The second connection part 22w is positioned in the middle between the first linear part 22P and the second linear part 22Q in the circumferential direction, that is, the second connection part 22w is positioned between the third bridge section L3 and the fourth bridge section L4 to connect the third bridge section L3 and the fourth bridge section L4 together. The second connection part 22w forms the top part (top curving part) located in the bridge part 22R to be most distant in the axial direction from the one end surface 10a. In this example, the second connection part 22w extends approximately parallel to the one end surface 10a.

The second connection part 22w and the aforementioned first connection part 21w of the first coil segment 21 are located at: the common height position in the axial direction with respect to the one end surface 10a. The second connection part 22w is positioned outside the first connection part 21w in the radial direction to be opposed to the first connection part 21w at an interval.

In the present embodiment, the bending parts in the third bridge section L3 and the fourth bridge section L4 of the second coil segment are a third bending part 22t and a fourth bending part 22v, respectively, but they are not limited thereto, and N bending parts may be disposed in N positions where N is two or more. In that case, the Nth bending part that is relatively far away from the third curving part 22s or the fourth curving part 22u is set to have the inclination angle with respect to the one end surface 10a smaller than is the bending part of the N−1th bending part, which is relatively close to the third curving part 22s or the fourth curving part 22u. Furthermore, a structure in which the Nth bending part, which is the farthest from the third curving part 22s or the fourth curving part 22u, is set to an inclination angle θ=zero, and the top part of the bridge part 22R extends substantially parallel to the one end surface 10a may be adopted.

As in FIG. 1, the rotor 1Q includes a cylindrical rotor core 30, shaft 31 installed in the center of the rotor core 30 to be rotated around the central axis C, and a plurality of permanent magnets 3 arranged in a circumferential direction at the periphery of the rotor core 30.

The rotor core 30 includes circular electromagnetic steel plates with magnetism, such as silicon steel, laminated concentrically about: the central axis C. The electromagnetic steel plates are connected by welding at multiple locations on the outer periphery while laminated to each other. The rotor core 30 is separated from the inner peripheral surface 10c of the stator core 10 by a small gap (air gap), and is arranged coaxially with the central axis C of the stator core 10. In other words, the outer peripheral surface of the rotor core 30 is opposed to the tip end surface of the teeth 11 corresponding to the inner peripheral surface 10c of the stator core 10 with a small gap (air gap) therebetween. The rotor core 30 has one first inner hole 30a penetrating coaxially with the central axis C and a plurality of second inner holes 30b aligned in the circumferential direction at the outer periphery and penetrating in the axial direction.

The shaft 31 is formed in the shape of a cylinder, and is inserted and fitted into the first inner hole 30a of the rotor core 30. The shaft 31 extends coaxially with the central axis C of the rotor core 30. The shaft 31 rotates together with the rotor core 30, and transmits rotational power to a wheel or the like, which is not shown, through connecting gears, etc. The permanent magnets 32 extend over the entire axial length of the rotor core 30, and are arranged at predetermined intervals in the circumferential direction of the rotor core 30. The permanent magnets 32 are rectangular in cross section, and formed in a bar shape extending in the axial direction.

In the embodiment structured as above, as in FIGS. 4 and 5, the bridge part 21R of the first coil segment 21 and the bridge part 22R of the second coil segment 22 are adjacent to each other in the radial direction of the stator core 10 while they are distant from each other in the radial direction of the stator core 10, and thus, they do not interfere with each other. That is, the third bridge section L3 and the fourth bridge section L4 of the second coil segment 22 are positioned more radially outside of the stator core 10 than is the second bridge section L2 of the first coil segment 21, with a gap therebetween. The bridge parts 21R and 22R adjacent to each other in the radial direction of the stator core 10 do not vertically overlap with each other in the axial direction of the stator core 10. Therefore, the projection height of the stator core 10 in the axial direction can be suppressed by sufficiently bending or curving the bridge parts 21R and 22P with respect to the one end surface 10a of the stator core 10 independently without interference therebetween. As can be understood from the above, the first coil segment 21 and the second coil segment 22 can set the axial projection length of the first coil end 20a from the one end surface 10a of the stator core 10 to be relatively short.

Figure 7:
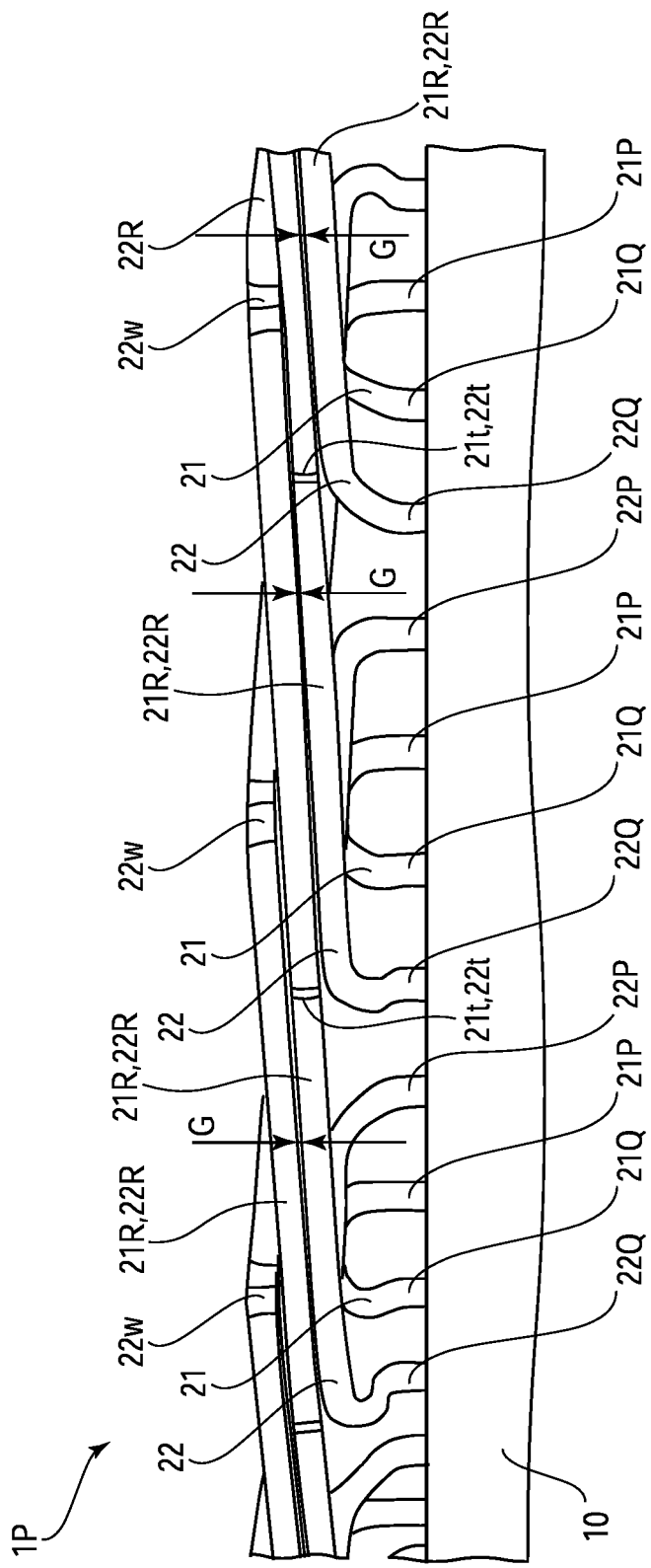
FIG. 7 is a side view illustrating multiple pairs of the first coil segments and the second coil segments arranged in the outermost part of the slots.

Furthermore, as in FIG. 7, if a plurality of pairs of the first coil segments 21 and the second coil segments 22 are arranged in the circumferential direction, the bridge parts 21R and 22R of the first and second coil segments 21 and 22 may include first and second bending parts 21t and 21v and third and fourth bending parts 22t and 22v which shallow the inclination angle with respect to the one end surface 10a of the stator core 10 in order to reduce a gap G formed in the axis direction between the bridge parts 21R and 22R of the first and second coil segments adjacent in the circumferential direction of the stator core 10. That is, the bridge parts 21P and 22R with smaller inclination angle with respect to the one end surface 10a with the first and second bending parts 21t and 21v and third and fourth bending parts 22t and 22v are adjacent at a relatively small angle with respect to the other first and second coil segments adjacent to each other in the circumferential direction of the stator core 10. As can be understood from the above, the first coil segment 21 and the second coil segment 22 can set the axial projection length of the first coil end 20a from the one end surface 10a of the stator core 10 to be relatively short.

With the shortened projection length of the coil ends, the stator 1P of the rotary electric machine 1 can be miniaturized, and the rotary electric machine 1 including the stator 1P can be miniaturized as well.

Furthermore, the bridge part 21R of the first coil segment 21 includes, between the first bridge section L1 and the second bridge section L2, the first connection part 21w bent or curved in the radial direction. Similarly, the bridge part 22R of the second coil segment 22 include, between the third bridge section L3 and the fourth bridge section L4, the second connection part 22w bent or curved in the radial direction and opposed to the first connection part 21w with a gap therebetween. With such a structure, the first coil segment 21 and the second coil segment 22 can further suppress the axial projection length of the first coil end 20a from the one end surface 10a of the stator core 10. Thus, the stator 1P of the rotary electric machine 1 and the rotary electric machine 1 including the stator 1E, can be miniaturized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of coil turns, and the number of coil segments can be increased or decreased as appropriate, without being limited to the numbers of the above-mentioned embodiment. The rotor and the rotary electric machine of the embodiment are not limited to permanent magnet field motors, but may be applied to wound field rotary electric machines, and induction rotary electric machines. The dimensions, material, shape, etc., of the rotor are not limited to those of the embodiment described above, but may be changed in various ways according to the design. Specifically, instead of the structure in which eight coil segments are installed in each slot 13 of the stator core 10 as in the embodiment, a structure in which six or fewer or ten or more coil segments are installed in each slot may be adopted.

What is claimed is:

1. A stator of rotary electric machine; comprising:
a stator core including a yoke, a plurality of teeth, one end surface positioned at one end of an axial direction, and other end surface positioned in the other end of the axial direction, the stator core forming slots each extending in a radial direction between the teeth adjacent to each other; and
a plurality of stator coils each of which is structured by joining a plurality of coil segments to each other, each of the coil segments being formed of a rectangular conductor and including a first linear part and a second linear part positioned separately in the slots, and a bridge part connecting the first linear part and the second linear part on a side of the one end surface of the stator core, wherein
the coil segments include:
a first coil segment including a first linear part positioned outermost in the radial direction among the coil segments arranged in the radial direction in the slot, a second linear part positioned outermost in the radial direction among the coil segments in a different slot, and a bridge part, and
a second coil segment including a first linear part positioned outermost in the radial direction among the coil segments in the slot adjacent to the first linear part of the first coil segment in the opposite side of the second linear part of the first coil segment, a second linear part positioned outermost in the radial direction among the coil segments in the slot adjacent to the second linear part of the first coil segment in the opposite side of the first linear part of the first coil segment, and a bridge part, and the bridge part of the first coil segment includes a first bridge section extending in a circumferential direction of the stator core toward the second linear part through a first curving part curving from the first linear part of the first coil segment to the second linear part side, inclining outward in the axial direction at a first inclination angle with respect to a flat surface parallel to the one end surface, the first bridge section including a first bending part in a halfway through the circumferential direction forming a second inclination angle as the angle inclining with respect to the flat surface parallel to the one end surface, which is smaller than the first inclination angle, and a second bridge section extending in the circumferential direction toward the first linear part on the outside in the radial direction than is the first bridge section through a second curving part curving outward in the radial direction from the second linear part of the first coil segment, inclining outward in the axial direction at a third inclination angle with respect to a flat surface parallel to the one end surface, the second bridge section including a second bending part in a halfway through the circumferential direction forming a fourth inclination angle as the angle inclining with respect to the one end surface, which is smaller than the third inclination angle, and the bridge part of the second coil segment includes a third bridge section extending in the circumferential direction toward the second linear part of the second coil segment on the outside in the radial direction than is the second bridge section through a third curving part curving outward in the radial direction greater than is the second curving part from the first linear part of the second coil segment, inclining outward in the axial direction at a fifth inclination angle with respect to a flat surface parallel to the one end surface, the third bridge section including a third bending part in a halfway through the circumferential direction forming a sixth inclination angle as the angle inclining with respect to a flat surface parallel to the one end surface, which is smaller than the fifth inclination angle, and a fourth bridge section extending in the circumferential direction toward the first linear part of the second coil segment in the outside in the radial direction than is the third bridge section through a fourth curving part curving outward in the radial direction greater than is the third curving part from the second linear part of the second coil segment, inclining outward in the axial direction at a seventh inclination angle with respect to a flat surface parallel to the one end surface, the fourth bridge section including a fourth bending part forming an eighth inclination angle as the angle inclining with respect to a flat surface parallel to the one end surface, which is smaller than the seventh inclination angle.

2. The stator of rotary electric machine of claim 1, wherein the bridge part of the first coil segment includes a first connection part positioned between the first bridge section and the second bridge section connecting the first bridge section and the second bridge section, the bridge part of the second coil segment includes a second connection part positioned between the third bridge section and the fourth bridge section connecting the third bridge section and the fourth bridge section, and the first connection part and the second connection part are arranged in a common height position in the axial direction with respect to the one end surface while being opposed to each other at an interval.

3. A rotary electric machine comprising:

a stator of claim 1; and a rotor arranged in a field space of the stator.

4. A rotary electric machine comprising:

a stator of claim 2; and a rotor arranged in a field space of the stator.

* * * * *